United States Patent
Omiya et al.

[11] Patent Number: 6,158,900
[45] Date of Patent: Dec. 12, 2000

[54] FERRULE FOR OPTICAL FIBER CONNECTOR AND METHOD FOR PRODUCTION THEREOF

[75] Inventors: Kazuo Omiya, Kurobe; Takeshi Taniguchi; Junichi Nagahora, both of Sendai; Akihisa Inoue, 11-806, Kawauchij utaku, 35 banchi, Motohasekura, Kawauchi, Aoba-ku, Sendai-shi, Miyagi-ken, all of Japan

[73] Assignees: YKK Corporation, Tokyo; Akihisa Inoue, Miyagi-ken, both of Japan

[21] Appl. No.: 08/993,573

[22] Filed: Dec. 18, 1997

[30]         Foreign Application Priority Data

Dec. 26, 1996   [JP]   Japan ..................... 8-356345

[51] Int. Cl.⁷ ...................................................... G02B 6/36
[52] U.S. Cl. .............................................. 385/78; 385/60
[58] Field of Search .......................... 385/78, 84, 79–83, 385/85, 60–68

[56]             References Cited

U.S. PATENT DOCUMENTS

| | | | |
|---|---|---|---|
| 3,403,238 | 9/1968 | Buehler et al. | 337/393 |
| 4,261,644 | 4/1981 | Giannaris | 385/99 |
| 4,456,713 | 6/1984 | French et al. | 523/455 |
| 4,753,902 | 6/1988 | Ketcham | 501/87 |
| 4,762,678 | 8/1988 | Dolgin | 419/28 |
| 4,797,236 | 1/1989 | Kojima | 264/40.1 |
| 4,850,664 | 7/1989 | Iri et al. | 385/85 |
| 5,015,617 | 5/1991 | Ohata et al. | 502/304 |
| 5,032,196 | 7/1991 | Masumoto et al. | 148/403 |
| 5,112,781 | 5/1992 | Jada | 501/95.1 |
| 5,213,148 | 5/1993 | Masumoto et al. | |
| 5,222,169 | 6/1993 | Chang et al. | 385/87 |
| 5,316,711 | 5/1994 | Throne | 264/68 |
| 5,482,451 | 1/1996 | Johnson et al. | 425/116 |
| 5,615,291 | 3/1997 | Hayakawa et al. | 385/84 |
| 5,631,986 | 5/1997 | Frey et al. | 385/78 |
| 5,862,280 | 1/1999 | Tanaka et al. | 385/78 |

FOREIGN PATENT DOCUMENTS

| | | |
|---|---|---|
| 0112072A2 | 6/1984 | European Pat. Off. . |
| 1-45042 | 10/1989 | Japan . |
| 7-174937 | 7/1995 | Japan . |
| 1448975 | 9/1976 | United Kingdom . |

OTHER PUBLICATIONS

Crystallographic Analysis Of Tini Shape Memory Alloy Thin Film For Micro Actuator, Koji Ikuta et al., Department of Mathematical Engineering and Information Physics Faculty of Engineering, University of Tokyo (No Date).

*Primary Examiner*—Rodney Bovernick
*Assistant Examiner*—Michael J. Stahl
*Attorney, Agent, or Firm*—Finnegan, Henderson, Farabow, Garrett, & Dunner L.L.P.

[57]              ABSTRACT

Disclosed are ferrules for an optical fiber connector provided with an insertion hole for setting an optical fiber in position and methods for the production thereof. The ferrule is formed of an amorphous alloy possessing at least a glass transition region, preferably a glass transition region of not less than 30 K in temperature width. Preferably the ferrule is formed of an amorphous alloy having a composition represented by the following general formula and containing an amorphous phase in a volumetric ratio of at least 50%:

$$X_a M_b Al_c$$

wherein X represents at least one element selected from the group consisting of Zr and Hf, M represents at least one element selected from the group consisting of Mn, Fe, Co, Ni, and Cu, and a, b, and c represent such atomic percentages as respectively satisfy $25 \leq a \leq 85$, $5 \leq b \leq 70$, and $0 < c \leq 35$. Such a ferrule can manufactured with high mass-producibility by a metal mold casting method or molding method.

7 Claims, 2 Drawing Sheets

FERRULE FOR OPTICAL FIBER CONNECTOR AND METHOD FOR PRODUCTION THEREOF

BACKGROUND OF THE INVENTION

1. Field of the Invention

This invention relates to a ferrule for an optical fiber connector (hereinafter referred to occasionally as "optical connector") which is used in connecting adjoining single mode optical fibers and to a method for the production thereof.

2. Description of the Prior Art

Generally, the optical fiber connector, as illustrated in FIG. 1, for example, is composed of a plug 100 to which is connected an optical fiber cord 110 having an optical fiber inserted and fixed therein along the central axis thereof and a hollow cylindrical sleeve 120 adapted to couple and align two such plugs. Unlike the electric connector, the optical fiber connector is particularly required to align exactly the opposed ends of two optical fibers to be connected.

For this purpose, ferrules 101 which are adapted for the insertion of the leading ends of two very thin optical fibers to be connected are popularly used. The connection of the two optical fibers is attained by abutting two such ferrules 101 against each other. Specifically, it is based on the procedure which comprises causing two ferrules 101 each having the leading end of an optical fiber inserted and fixed therein to be severally fixed concentrically to two plugs 100 finished in a prescribed outside diameter, inserting the two plugs 100 into one sleeve 120 through the opposite ends thereof, and abutting the ferrules 101 against each other thereby aligning the axes of the optical fibers.

As mentioned above, the ferrule for an optical fiber connector, for the sake of perfect coincidence between the axial lines of the opposed terminals of the optical fibers, requires to warrant extremely high accuracy for the inside diameter of the fine insertion hole of the ferrule which substantially retains an optical fiber and for the outside diameter of the ferrule and further requires to secure coincidence between the axial line of the fine hole and the axial line of the outside diameter.

Since the conventional ferrule has been manufactured by mechanically working a metallic material or a ceramic material, it has room for improvement in the ability of mass-production, namely the cost of fabrication. Particularly, since the ceramic material such as, for example, the partially stabilized zirconia (PSZ) is subjected to primary formation such as by the powder extrusion or injection molding and then to such steps as degreasing, sintering, and mechanical working, the process of production is lengthy, the cost of production is inevitably large, and the material which is brittle and rigid entails such problems as chipping and relying for finish of surface polishing on grain size. To fulfill the task of cost reduction, the concept of injection molding a carbon fiber-reinforced plastic composite material has been proposed. For application to the optical connector to which the ferrules are frequently attached and detached repeatedly, however, this method possibly entails such problems as deformation and deterioration on account of the properties of the material.

SUMMARY OF THE INVENTION

In view of the problems mentioned above, an object of the present invention is to provide a method which, by the combination of the conventional technique based on the metal mold casting method or molding method with an amorphous alloy exhibiting a glass transition region, is enabled to produce a ferrule of preferred shape of highly satisfactory dimensional accuracy in a single process with high mass-producibility and allowed to omit or diminish markedly such steps of mechanical working as polishing and the consequent inexpensive provision of a ferrule manifesting preferred properties of material, enjoying highly efficient light transmission, and excelling in durability, strength, impact resistance, and workability.

To accomplish the object described above, the present invention provides a ferrule for an optical fiber connector containing an insertion hole for fixing an optical fiber in position, which ferrule is formed of an amorphous alloy possessing at least a glass transition region, particularly a glass transition region of not less than 30 K, preferably not less than 60 K, in temperature width.

In a preferred embodiment, the ferrule for an optical fiber connector may be formed of an amorphous alloy having a composition represented by the general formula: $X_aM_bAl_c$, wherein X represents at least one element selected from the group consisting of Zr and Hf, M represents at least one element selected from the group consisting of Mn, Fe, Co, Ni, and Cu, and a, b, and c represent such atomic percentages as respectively satisfy $25 \leq a \leq 85$, $5 \leq b \leq 70$, and $0 < c \leq 35$, and containing an amorphous phase in a volumetric ratio of at least 50%.

The present invention further provides methods for the production of such a ferrule for an optical fiber connector as is described above.

One of the methods is characterized by comprising the steps of providing a container for melting and retaining an alloy material capable of producing an amorphous alloy possessing a glass transition region, preferably an amorphous alloy represented by the general formula mentioned above, providing a metal mold provided with a cavity of the shape of the product aimed at, coupling a hole formed in, for example, the lower or upper part of the container with a gate of the metal mold, for example by disposing the metal mold beneath or on the container, applying pressure on a melt of the alloy thereby enabling a prescribed amount of the melt to pass through the hole in the lower or upper part of the container and fill the cavity of the metal mold, and solidifying the melt in the metal mold at a cooling rate of not less than 10 K(Kelvin scale)/sec. thereby giving rise to the product formed substantially of an amorphous phase.

Another method is characterized by comprising the steps of heating an amorphous material formed of the alloy represented by the general formula mentioned above to the temperature of a supercooled liquid region, inserting the resultant hot amorphous material into a container held at the same temperature, coupling with the container a metal mold provided with a cavity of the shape of the product aimed at, and forcing a prescribed amount of the alloy in the state of a supercooled liquid into the metal mold by virtue of the viscous flow thereof to form a ferrule.

BRIEF DESCRIPTION OF THE DRAWINGS

Other objects, features, and advantages of the invention will become apparent from the following description taken together with the drawings, in which.

DETAILED DESCRIPTION OF THE INVENTION

Figure 1:
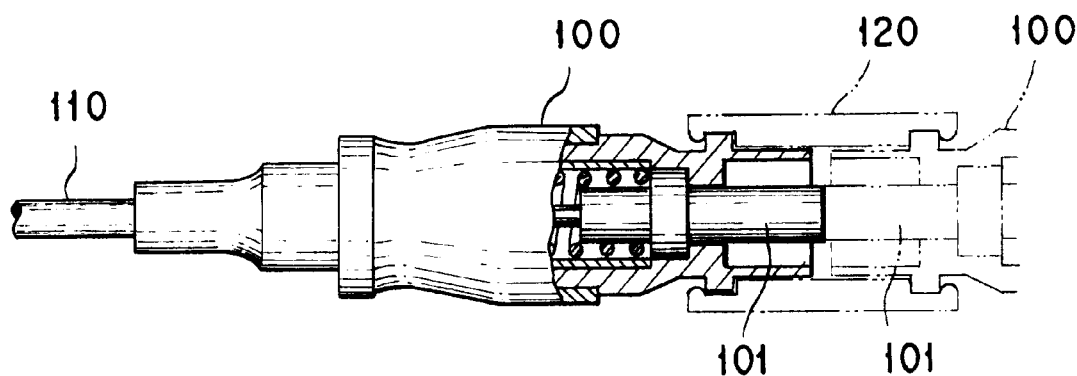
FIG. 1 is a partially cutaway schematic front view of one example of the conventional optical fiber connector.

The present inventors, after a study on amorphous alloys, have unveiled alloys manifesting glass transition behaviors successively and demonstrated their material properties. Among other alloys mentioned above, the Zr-TM-Al and Hf-TM-Al (TM: transition metal) amorphous alloys which have very wide differences between the glass transition temperature (Tg) and the crystallization temperature (Tx), exhibit high strength and high corrosion resistance, possess very wide supercooled liquid ranges (glass transition ranges), $\Delta Tx=Tx-Tg$, of not less than 30 K, and extremely wide supercooled liquid ranges of not less than 60 K in the case of the Zr-TM-Al amorphous alloys. In the above temperature ranges, these amorphous alloys manifest very satisfactory workability owing to viscous flow even at low stress of less than some tens of MPa. They are characterized by permitting very easy and stable manufacture of amorphous bulk materials even in accordance with a casting method using a cooling rate of the order of some tens of K/s. The aforementioned Zr-TM-Al and Hf-TM-Al amorphous alloys are disclosed in U.S. Pat. No. 5,032,196 issued Jul. 16, 1991 to Masumoto et al., the teachings of which are hereby incorporated by reference. After a further study in search of uses for these alloys, the inventors have ascertained that by the metal mold casting from melt and by the viscous flow molding process utilizing the glass transition range as well, these alloys produce amorphous materials and permit very faithful reproduction of the shape and size of a cavity of a metal mold and, with the physical properties of the alloys as a contributory factor, befit the ferrule for an optical fiber connector. This invention has been perfected as a result.

The Zr-TM-Al and Hf-TM-Al amorphous alloys to be used in the present invention possess very large range of $\Delta Tx$, though variable with the composition of alloy and the method of determination. The $Zr_{60}Al_{15}Co_{2.5}Ni_{7.5}Cu_{15}$ alloy (Tg: 652 K and Tx: 768 K), for example, has such an extremely wide $\Delta Tx$ as 116 K. It also offers very satisfactory resistance to oxidation such that it is hardly oxidized even when it is heated in the air up to the high temperature of Tg. The Vickers hardness (Hv) of this alloy at temperatures from room temperature through the neighborhood of Tg is 460 (DPN), the tensile strength thereof is 1,600 MPa, and the bending strength thereof is up to 3,000 MPa. The thermal expansion coefficient, $\alpha$ of this alloy from room temperature through the neighborhood of Tg is as small as $1\times10^{-5}$/K, the Young's modulus thereof is 91 GPa, and the elastic limit thereof in a compressed state exceeds 4–5%. Further, the toughness of the alloy is high such that the Charpy impact value falls in the range of 6–7 $J/cm^2$. This alloy, while exhibiting such properties of very high strength as mentioned above, has the flow stress thereof lowered to the neighborhood of 10 MPa when it is heated up to the glass transition range thereof. This alloy, therefore, is characterized by being worked very easily and being manufactured with low stress into minute parts and high-precision parts complicated in shape. Moreover, owing to the properties of the so-called glass (amorphous) substance, this alloy is characterized by allowing manufacture of formed (deformed) articles with surfaces of extremely high smoothness and having substantially no possibility of forming a step which would arise when a slip band appeared on the surface as during the deformation of a crystalline alloy.

Generally, an amorphous alloy begins to crystallize when it is heated to the glass transition range thereof and retained therein for a long time. In contrast, the present alloy which possesses such a wide $\Delta Tx$ range as mentioned above enjoys a stable amorphous phase and, when kept at a temperature properly selected in the $\Delta Tx$ range, avoids producing any crystal for a duration up to about two hours. The user of this alloy, therefore, does not need to feel any anxiety about the occurrence of crystallization during the standard forming process.

The present alloy manifests this property unreservedly during the course of transformation thereof from the molten state o the solid state. Generally, the manufacture of an amorphous alloy requires rapid cooling. In contrast, the present alloy allows easy production of a bulk material of a single amorphous phase from a melt by the cooling which is effected at a rate of about 10 K/s. The solid bulk material consequently formed also has a very smooth surface. The alloy has transferability such that even a scratch of the order of microns inflicted by the polishing work on the surface of a metal mold is faithfully reproduced.

When the present alloy is adopted as the material for the ferrule, therefore, the metal mold to be used for producing the ferrule is only required to have the surface thereof adjusted to fulfill the surface quality expected of the ferrule because the ferrule produced faithfully reproduces the surface quality of the metal mold. In the conventional metal mold casting method or molding method, therefore, this alloy allows the steps for adjusting the size and the surface roughness of the mold to be omitted or diminished.

The characteristics of the present alloy including relatively low hardness, high tensile strength, high bending strength, relatively low Young's modulus, high elastic limit, high impact resistance, smoothness of surface, and high accuracy of casting or molding render this alloy appropriate for use as the material for the ferrule for the optical fiber connector. They even allow this alloy to be molded for mass production by the conventional method.

The advantages derived from adopting this alloy for the ferrule will be described more specifically below.

The first advantage resides in allowing mass-production of formed articles of high accuracy. The diameter of the insertion hole of the ferrule which directly retains an optical fiber is required to approximate as closely to the diameter of the optical fiber as possible. The formed article heretofore obtained by injecting, degreasing, and sintering a ceramic material fails to satisfy the dimensional accuracy and the surface quality of a ferrule. It has been customary, therefore, to produce a formed article in a size allowing for machining, then working the inside diameter by wire lapping, and finally working the outside diameter by a complicated polishing treatment. In the present invention, the use of a properly prepared metal mold in the casting and in the viscous flow forming (glass shaping) as well allows the formed articles to be mass-produced without requiring a finish polishing or with a supplementary simple finish treatment. The metal mold is highly effective in producing formed articles satisfactory in terms of the roundness of the cross section of the minute insertion hole and the finish of the inner surface of the hole. The PC polishing which is usually performed on the leading end of a ferrule to impart the spherical convex surface thereto for the purpose of ensuring close contact of glass fibers is no longer necessary. It suffices to perform the final polish after the optical fiber has been set in position. The lengthy process of manufacture using a metallic material and a ceramic material, therefore, can be curtailed in a great measure. The same remarks hold good for the outside diameter of the ferrule and the coincidence between the axial line of the outside diameter and the axial line of the minute insertion hole of the ferrule.

The second advantage consists in such mechanical properties of the ferrule as strength and toughness. Since the ferrule for an optical fiber connector is frequently attached and detached repeatedly, the abutting part at the leading end thereof must not settle, abrade, or crack. The hardness, strength, and toughness of the alloy mentioned above are enough to preclude the defects mentioned above.

The amorphous alloy possessed of the characteristics mentioned above can be advantageously utilized for the sleeve and other component parts of the optical connector and for the precision parts for micromachines as well as for the ferrule.

Now, the ferrule of the present invention will be described below with reference to the accompanying drawings.

Figure 2:
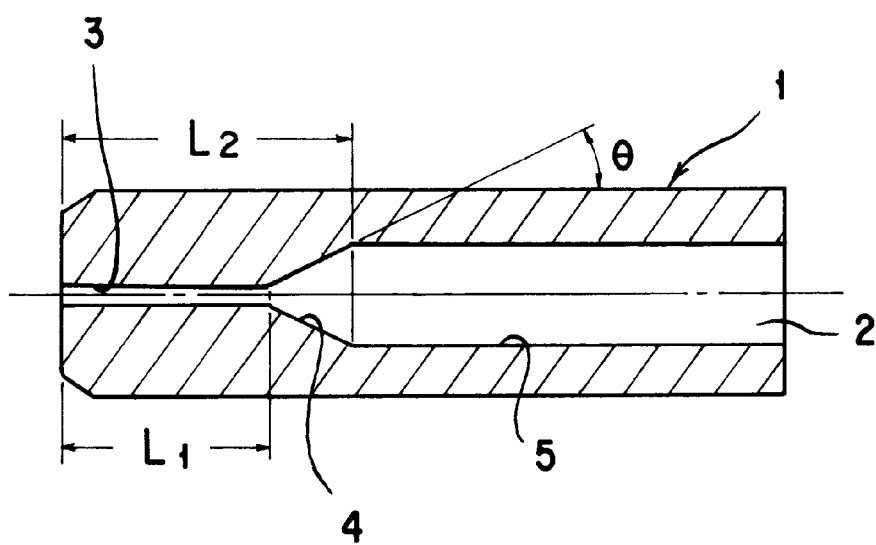
FIG. 2 is a schematic enlarged cross section illustrating one embodiment of a ferrule of the present invention.

FIG. 2 represents one preferred embodiment of the ferrule of the present invention. This ferrule 1 is provided with an insertion through-hole 2 having rectilinearly formed along the axial line thereof a small-diameter part 3 for the insertion of an optical fiber end, a large-diameter part 5 for the insertion of a sheathed optical fiber portion, and a tapered-diameter part 4 interposed between the small-diameter part 3 and the large-diameter part 5 and diverged from the small-diameter part 3 to the large-diameter part 5.

In such a ferrule 1, it is desired that the through-hole has a length of not less than 1 mm for the small-diameter part 3 for the insertion of an optical fiber end and a length $L_2$ of less than 6 mm for the total of the small-diameter part 3 and the tapered-diameter part 4.

If the length, $L_1$, of the small-diameter part of the ferrule for the insertion of an optical fiber end is less than 1 mm, the parallelism of the small diameter part 3 to the outside diameter of the ferrule will not be easily attained and the connection of two optical fibers by the abutment of the end faces of the ferrules will be easily impaired. Thus, the length, $L_1$, must be not less than 1 mm.

The attachment of an optical fiber to the ferrule 1 can be attained without inflicting any breakage on the optical fiber by stripping a sheathed optical fiber of a sheath in the leading end part thereof, preferably at an angle which corresponds to the angle of inclination, θ, of the tapered-diameter part 4 of the ferrule, in a length equivalent to the small-diameter part 3 for the insertion of an optical fiber end, applying an adhesive agent to the leading end part of the sheathed optical fiber, and inserting the leading end part into the insertion through-hole 2 of the ferrule 1. Further, the work itself of inserting the optical fiber into the ferrule is stabilized and the adhesive strength between the optical fiber and the ferrule is sufficient. In this case, when the large-diameter part 5 for the insertion of a sheathed optical fiber in the ferrule 1 is given an inside diameter slightly larger than the outside diameter of the sheathed optical fiber, by merely inserting the stripped sheathed optical fiber into the insertion through-hole 2 of the ferrule 1, the adhesive agent applied to the leading end part of the sheathed optical fiber is enabled to permeate thoroughly as far as the leading end part of the small-diameter part 3 for the insertion of an optical fiber end through the medium of the tapered-diameter part 4 owing to the interposition of the tapered-diameter part 4 between the small-diameter part 3 for the insertion of an optical fiber end and the large-diameter part 5 for the insertion of a sheathed optical fiber. As a result, both the optical fiber end and the leading end of the sheathed optical fiber are adhered to the insertion through-hole 2 of the ferrule 1 with conspicuous strength. The ferrule to which the optical fiber has been joined as described above, optionally after having the end face thereof together with that of the optical fiber subjected to the PC polishing, is fitted with a plug as illustrated in FIG. 1 and then put to use for the union of two optical fibers.

Now, one example of the method for the production of the ferrule of the present invention will be described below with reference to FIG. 3.

Figure 3:
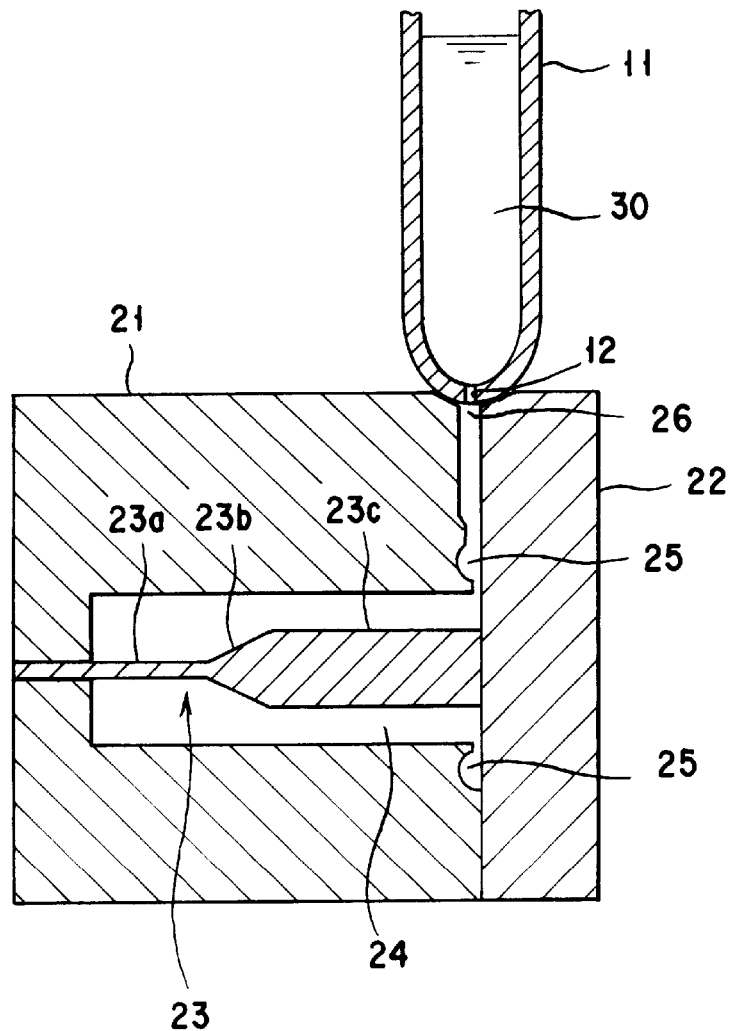
FIG. 3 is a partial schematic cross section illustrating one example of an apparatus to be used for the method of the present invention.

In FIG. 3, the reference numeral 11 denotes a container for melting an alloy material capable of producing such an amorphous alloy as mentioned above and holding the produced melt therein. Beneath this container 11 are disposed split metal molds 21 and 22 for jointly forming a cavity 24 of the shape of a product aimed at. Any of such known means (not shown) as, for example, the high-frequency induction heating and the resistance heating may be adopted for heating the container 11. The cavity 24 is defined by the metal molds 21 and 22 and a core pin 23. The core pin 23 has the shape which results from the interconnection of a small-diameter part 23a and a large-diameter part 23c through the medium of a tapered-diameter part 23b in conformity with the shape of the insertion through-hole 2 of the ferrule 1 mentioned above. The small-diameter part 23a of the core pin 23 has a small length as compared with the equivalent part of the conventional concept. The core pin 23, therefore, enjoys ease of fabrication, exhibits high strength, and offers a long service life. Further, since the core pin has high strength, the cavity 24 is enabled to use high molding pressure and produce a ferrule with high density and high dimensional accuracy.

The manufacture of the ferrule is accomplished by coupling a slender hole 12 formed in the bottom part of the container 11 with a gate 26 defined jointly by the metal molds 21 and 22, then applying pressure on a melt 30 in the container 11 through the medium of an inert gas, for example, thereby causing a prescribed amount of the molten alloy to enter the slender hole 12 in the bottom part of the container 11, pass through an annular runner 25 in the joint of the metal mold, and fill the cavity 24, and allowing the molten alloy to solidify preferably at a cooling rate of not less than 10 K/s. Thus, the ferrule of alloy formed substantially of an amorphous phase is obtained.

Besides the alloy casting method described above, the extrusion molding is also available for the manufacture of the ferrule. Since the amorphous alloy mentioned above possesses a large supercooled liquid region ΔTx, the ferrule can be obtained in a prescribed shape by heating a material of this amorphous alloy to a temperature in the supercooled liquid region, inserting the hot material in a container retained at the same temperature, connecting this container to the metal mold 21 and 22 provided with the cavity 24 of the shape of a product aimed at as illustrated in FIG. 3, pressing a prescribed amount of the heated alloy into the cavity by virtue of the viscous flow of the supercooled liquid, and molding the alloy.

Figure 4:
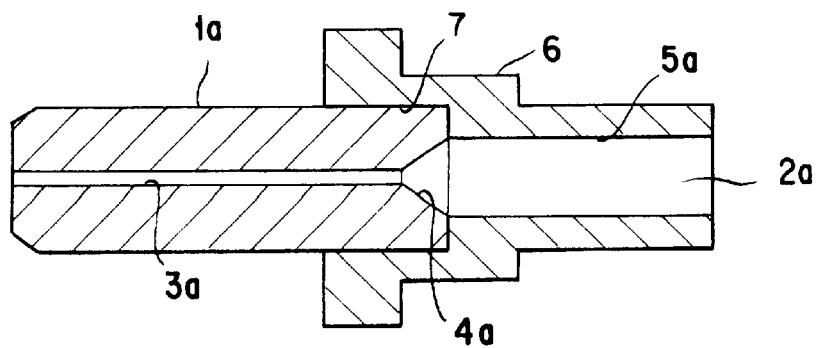
FIG. 4 is a schematic enlarged cross section illustrating another embodiment of the ferrule of the present invention.

FIG. 4 illustrates another embodiment of the ferrule of the present invention. In this embodiment, a ferrule 1a which incorporates therein a small-diameter part 3a for the insertion of an optical fiber end and a tapered-diameter part 4a formed in the terminal part of the small-diameter part 3a along the axial line thereof and a flange 6 which has a large-diameter part 5a for the insertion of a sheathed optical fiber portion formed along the axial line thereof are integrally joined. To be specific, they are assembled by securing tightly the terminal part of the ferrule 1a enclosing the tapered-diameter part 4a therein in a hole part 7 in the leading terminal of the flange 6 by means of close fit or adhesion. Consequently, the insertion hole 2a having the small-diameter part 3a of the ferrule 1a and the large-diameter part 5a of the flange 6 are interconnected through the medium of the tapered-diameter part 4a is formed along the axial line. The embodiment which combines the ferrule with the flange integrally as described above likewise derives the advantages of the present invention mentioned above.

Now, the present invention will be described more specifically below with reference to working examples which have confirmed the effect of the present invention.

EXAMPLE 1

Various alloys including $Zr_{60}Al_{15}Co_{2.5}Ni_{7.5}Cu_{15}$ and shown in the following table were manufactured by melting relevant component metals. They were each placed in a quartz crucible and melted thoroughly by high-frequency induction heating. The melt was injected under a gaseous pressure of 2 kgf/cm$^2$ through a slender hole formed in the lower part of the crucible into a copper mold provided with a cylindrical cavity, 2 mm in diameter and 30 mm in length, and kept at room temperature to obtain a cylindrical specimen for the determination of mechanical properties. The results of this determination are shown in the table.

TABLE

| Alloy used | Tensile strength (MPa) | Bending strength (MPa) | $\alpha\ 10^{-5}/K$ (room temperature-Tg) | E (GPa) | Hardness Hv | Tg (K) | Tx (K) |
| --- | --- | --- | --- | --- | --- | --- | --- |
| $Zr_{67}Cu_{33}$ | 1,880 | 3,520 | 0.8 | 99 | 540 | 603 | 669 |
| $Zr_{65}Al_{7.5}Cu_{27.5}$ | 1,450 | 2,710 | 0.8 | 93 | 420 | 622 | 732 |
| $Zr_{65}Al_{7.5}Ni_{10}Cu_{17.5}$ | 1,480 | 2,770 | 0.9 | 92 | 430 | 630 | 736 |
| $Zr_{60}Al_{15}Co_{2.5}Ni_{7.5}Cu_{15}$ | 1,590 | 2,970 | 1.0 | 91 | 460 | 652 | 768 |

It is clearly noted from the table that the produced amorphous alloy materials showed such magnitudes of bending strength as notably surpass the magnitude (about 1,000 MPa) of the partially stabilized zirconia heretofore adopted as the material for the ferrule, such magnitudes of Young's modulus as approximate one half, and such magnitudes of hardness as approximate one third thereof, indicating that these alloy materials were vested with properties necessary as the material for the ferrule.

EXAMPLE 2

By the use of a WC-based hard metal mold constructed as illustrated in FIG. 3, the alloy of $Zr_{65}Al_{10}Ni_{10}Cu_{15}$ produced in advance by melting the relevant component metals was molded to manufacture a ferrule by following the procedure of Example 1. The metal mold thus used had the size thereof set in advance with due respect to the finish of the ferrule such that the subsequent step for finishing working or for polishing would be minimized and the inner surface of this metal mold was wholly finished in specular smoothness. The surface of the leading terminal of the ferrule which has the insertion through-hole for the optical fiber was shaped in spherical convex, 20 mm in radius of curvature, and polished for specular finish. After the casting, the joint with the gate was removed by precision cutting.

The formed article consequently obtained showed a mirror surface throughout the whole area. The total length of the ferrule was 10.5 mm and the length ($L_1$) of the small-diameter part for the insertion of the optical fiber end was 4 mm. The outside diameter of the ferrule, the inside diameter of the through-hole for the insertion of an optical fiber, the concentricity of these two diameters, the roundnesses of the diameters, and the cylindricities thereof for which accuracy dictates particular consideration were found to fall within the ranges of tolerance of 0.1–0.5 μm from the dimensions aimed at.

EXAMPLE 3

A metal mold of steel as illustrated in FIG. 3 and a metallic extruder were connected and a ferrule was manufactured by extruding the same alloy as used in Example 2. For the extrusion, amorphous billets, 25 mm in diameter and 40 mm in length, of the same alloy prepared separately by casting were used. The billets were preheated to 730 K and the container of the extruder and the inlet part and the molding part of the metal mold were similarly preheated to 730 K. The hot billets were inserted into the container of the extruder and then injected into the metal mold. The metal mold was cooled. Then the formed article was removed from the mold, deprived of the inlet part, and inspected. The outward appearance, the dimensional accuracy, the surface roughness, etc. of the formed article were found to be nearly equal to those of the ferrule obtained in Example 2.

According to the present invention, as described above, the ferrules satisfying the dimensional accuracy and the surface quality required of optical communication connectors can be manufactured with high productivity at a low cost by the metal mold casting method or molding method using the amorphous alloys having a wide glass transition region such as the Zr-TM-Al and Hf-TM-Al amorphous alloys. Further, since the amorphous alloy to be used for the present invention excels in strength, toughness, and resistance to corrosion, the ferrules manufactured from this amorphous alloy withstand long service without readily sustaining abrasion, deformation, chipping, or other similar defects.

While certain specific embodiments and working examples have been disclosed herein, the invention may be embodied in other specific forms without departing from the spirit or essential characteristics thereof. The described embodiments and examples are therefore to be considered in all respects as illustrative and not restrictive, the scope of the invention being indicated by the appended claims rather than by the foregoing description and all changes which come within the meaning and range of equivalency of the claims are, therefore, intended to be embraced therein.

What is claimed is:

1. A ferrule for an optical fiber connector provided with an insertion hole for setting an end of an optical fiber in position and adapted to be abutted against another ferrule having an end of another optical fiber fixed therein thereby aligning axes of the optical fibers, which ferrule is formed of an amorphous alloy having a composition represented by the following general formula and containing an amorphous phase in a volumetric ratio of at least 50%:

$$X_aM_bAl_c$$

wherein X represents at least one element selected from the group consisting of Zr and Hf, M represents at least one element selected from the group consisting of Mn, Fe, Co, Ni, and Cu, and a, b, and c represent such atomic percentages as respectively satisfy $25 \leq a \leq 85$, $5 \leq b \leq 70$, and $0 < c \leq 35$.

2. The ferrule according to claim 1, which is provided along the axis thereof with a small-diameter part for the insertion of an optical fiber end, a large-diameter part for the insertion of a sheathed optical fiber portion, and a tapered-diameter part interconnecting said large-diameter and small-diameter parts, said small-diameter part having a length of not less than 1 mm and the total of the length of said small-diameter part and the length of said tapered-diameter part being less than 6 mm.

3. A method for the production of a ferrule for an optical fiber connector set forth in claim 1, comprising the steps of:

heating an amorphous material formed of an alloy represented by the following general formula and containing an amorphous phase in a volumetric ratio of at least 50% to a temperature in a supercooled liquid region:

$$X_aM_bAl_c$$

X represents at least one element selected from the group consisting of Zr and Hf, M represents at least one element selected from the group consisting of Mn, Fe, Co, Ni, and Cu, and a, b, and c represent such atomic percentages as respectively satisfy $25 \leq a \leq 85$, $5 \leq b \leq 70$, and $0 < c \leq 35$;

inserting the resultant hot amorphous material in a container held at the same temperature;

connecting a metal mold provided with a cavity of the shape of a product aimed at to said container; and introducing a prescribed amount of said alloy under pressure into said metal mold by virtue of the viscous flow of said supercooled liquid to form a ferrule.

4. The ferrule according to claim 1, wherein said amorphous alloy has a glass transition region of temperature width of not less than 30 K.

5. The ferrule according to claim 1, wherein said amorphous alloy has a glass transition region of a temperature width of not less than 60 K.

6. A method for the production of a ferrule for an optical fiber connector provided with an insertion hole for setting an end of an optical fiber in position and adapted to be abutted against another ferrule having an end of another optical fiber fixed therein thereby aligning axes of the optical fibers, comprising the steps of:

providing a container for melting an alloy material capable of producing an amorphous alloy possessing a glass transition region, said container being provided with a hole and retaining a melt of said alloy material;

providing a metal mold provided with a gate and a cavity of the shape of a product aimed at;

connecting said hole formed in said container to the gate of said metal mold;

applying pressure on said melt in the container to introduce a prescribed amount of said melt via the hole of said container into said metal mold thereby filling said cavity with said melt; and solidifying said melt in said metal mold at a cooling rate of not less than 10 K/s to obtain a product formed substantially of an amorphous phase.

7. The method according to claim 6, wherein said alloy material is formed of an amorphous alloy having a composition represented by the following general formula and containing an amorphous phase in a volumetric ratio of at least 50%:

$$X_aM_bAl_c$$

wherein X represents at least one element selected from the group consisting of Zr and Hf, M represents at least one element selected from the group consisting of Mn, Fe, Co, Ni, and Cu, and a, b, and c represent such atomic percentages as respectively satisfy $25 \leq a \leq 85$, $5 \leq b \leq 70$, and $0 < c \leq 35$.

* * * * *